United States Patent
Panikkar

(10) Patent No.: US 12,353,581 B2
(45) Date of Patent: Jul. 8, 2025

(54) PROCESSING TRANSACTIONS USING NESTED DATA OBJECTS

(71) Applicant: Dell Products L.P., Round Rock, TX (US)

(72) Inventor: Shibi Panikkar, Bangalore (IN)

(73) Assignee: Dell Products L.P., Round Rock, TX (US)

(*) Notice: Subject to any disclaimer, the term of this patent is extended or adjusted under 35 U.S.C. 154(b) by 168 days.

(21) Appl. No.: 18/134,153

(22) Filed: Apr. 13, 2023

(65) Prior Publication Data

US 2024/0346163 A1    Oct. 17, 2024

(51) Int. Cl.
G06F 7/04      (2006.01)
G06F 21/62     (2013.01)
H04L 9/32      (2006.01)

(52) U.S. Cl.
CPC ........ *G06F 21/6218* (2013.01); *H04L 9/3242* (2013.01)

(58) Field of Classification Search
CPC . G06F 21/6218; H04L 9/3242; H04L 9/0825; H04L 9/0836; H04L 9/3236
See application file for complete search history.

(56) References Cited

U.S. PATENT DOCUMENTS 10,908,924 B2 * 2/2021 Pentland .......... G06F 9/44536
11,296,867 B2 * 4/2022 Scott ............... G06F 21/64
2020/0341951 A1 * 10/2020 Oberhofer .......... H04L 9/50
2020/0348949 A1 * 11/2020 Pentland .......... G06F 9/44536
2021/0014046 A1 * 1/2021 Ivkushkin ........ H04L 9/3239
2022/0318386 A1 * 10/2022 Bhosale ........... G06F 21/552

OTHER PUBLICATIONS

Turcu et al. On Open Nesting in Distributed Transactional Memory, Jul. 13, 2015, IEEE, pp. 1856-1868. (Year: 2015).*
Matri et al, Tyr: Blob Storage Meets Built-In Transactions, Nov. 18, 2016, IEEE, pp. 573-584. (Year: 2016).*
Haritonova, Anastasiya, "How Blockchain is Used in Legal Document Management", PixelPlex, available at: https://pixelplex.io/blog/blockchain-in-legal-document-management/ (last accessed Apr. 13, 2023), published Feb. 23, 2021.

* cited by examiner

Primary Examiner — Philip J Chea
Assistant Examiner — Jenise E Jackson
(74) Attorney, Agent, or Firm — Ryan, Mason & Lewis, LLP

(57) ABSTRACT

Methods, apparatus, and processor-readable storage media for processing transactions using nested data objects are provided herein. An example computer-implemented method includes: generating a nested data object corresponding to a file, where the nested data object includes a first layer for a first transaction related to the file; adding, for each of one or more additional transactions related to the file, a corresponding additional layer to the nested data object, where each layer of the nested data object include one or more respective hash values and one or more respective private keys; and transmitting the nested data object to a user device, where each layer of the nested object are encrypted based on a type of access specified for a user of the user device, and wherein each of the transactions is verifiable based at last in part on the one or more hash values of the corresponding layer.

20 Claims, 12 Drawing Sheets

PROCESSING TRANSACTIONS USING NESTED DATA OBJECTS

FIELD

The field relates generally to information processing, and more particularly to processing transactions associated with information processing systems.

BACKGROUND

Organizations are increasingly providing complex and configurable technologies, including as-a-service technologies. For such technologies, an initial configuration of hardware and/or services can be selected for one or more users. The configuration can typically be modified throughout the time that the hardware and/or services are deployed, for example, due to changing needs of the one or more users. In some instances, these modifications can be considered trusted transactions as they need to be verifiable and agreed upon by all entities that are involved.

SUMMARY

Illustrative embodiments of the disclosure provide techniques for processing trusted transactions and other types of transactions using nested data objects. An exemplary computer-implemented method includes generating a nested data object corresponding to at least one file, wherein the nested data object comprises a first layer for at least one first transaction related to the at least one file; adding, for each of one or more additional transactions related to the at least one file, a corresponding additional layer to the nested data object, wherein the first layer and the one or more additional layers each comprise one or more respective hash values and one or more respective private keys; and transmitting the nested data object to at least one user device, wherein the first layer and the one or more additional layers are each encrypted based at least in part on a type of access, from among a plurality of types of access, specified for at least one user of the at least one user device, and wherein a given transaction, from among the at least one first transaction and the one or more additional transactions, is verifiable by the at least one user device based at least in part on the one or more hash values of the corresponding layer.

Illustrative embodiments can provide significant advantages relative to conventional transaction processing techniques. For example, technical problems associated with verifying transactions are mitigated in one or more embodiments by encapsulating transaction data and other related data using nested data objects. The nested data objects can be transmitted in some embodiments over a network to one or more client devices in a quick and resource-efficient manner.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Transactions related to configurable technologies (e.g., as-a-service technologies) present technical challenges that are different than transactions related to conventional (e.g., perpetual) transactions. Conventional transactions are mainly static, and thus do not require ongoing changes and/or verification (e.g., between a user and a provider). In contrast, transactions related to configurable technologies (e.g., related to hardware and/or services) often change over time, and the transactions should be verifiable by all parties that are involved. The term "transaction" in this context and elsewhere herein is intended to be broadly construed to encompass one or more operations performed on a file (or other type of data) related to two or more entities. Non-limiting examples of such operations include creating, viewing, editing, updating, and/or modifying one or more files or metadata related to such files.

Conventional techniques for managing such transactions often require a significant amount of resources (such as time and/or hardware resources) to process changes and/or approvals for such transactions, which is often not desirable for configurable technologies. Such techniques do not address one or more of the following challenges related to configurable technologies: (1) implementing trusted transactions and/or changes; (2) implementing tamper proof transactions; (3) providing transactions with fast access (e.g., milliseconds or less) to one or more software applications; (4) enabling quick updates of transactions and approval of such updates; and (5) enabling fast verification of authenticity of transactions.

Some organizations have turned to blockchain technologies to address (1) and (2); however, transactions (e.g., related to files and/or contracts) can be large, and updating and/or verifying blockchains can be slow. This can require a considerable amount of time and resources to complete a transaction (e.g., Bitcoin and Ethereum can take approximately ten minutes and thirty seconds, respectively, to commit a single transaction). Moreover, if the chain is long and distributed, verifying the transaction can take an hour or more. Transaction data related to configurable technologies can be multiple megabytes (MBs), and it can take several minutes to store, read, and verify such data with current blockchain technology. Accordingly, such techniques do not effectively address the other challenges noted above.

Figure 1:
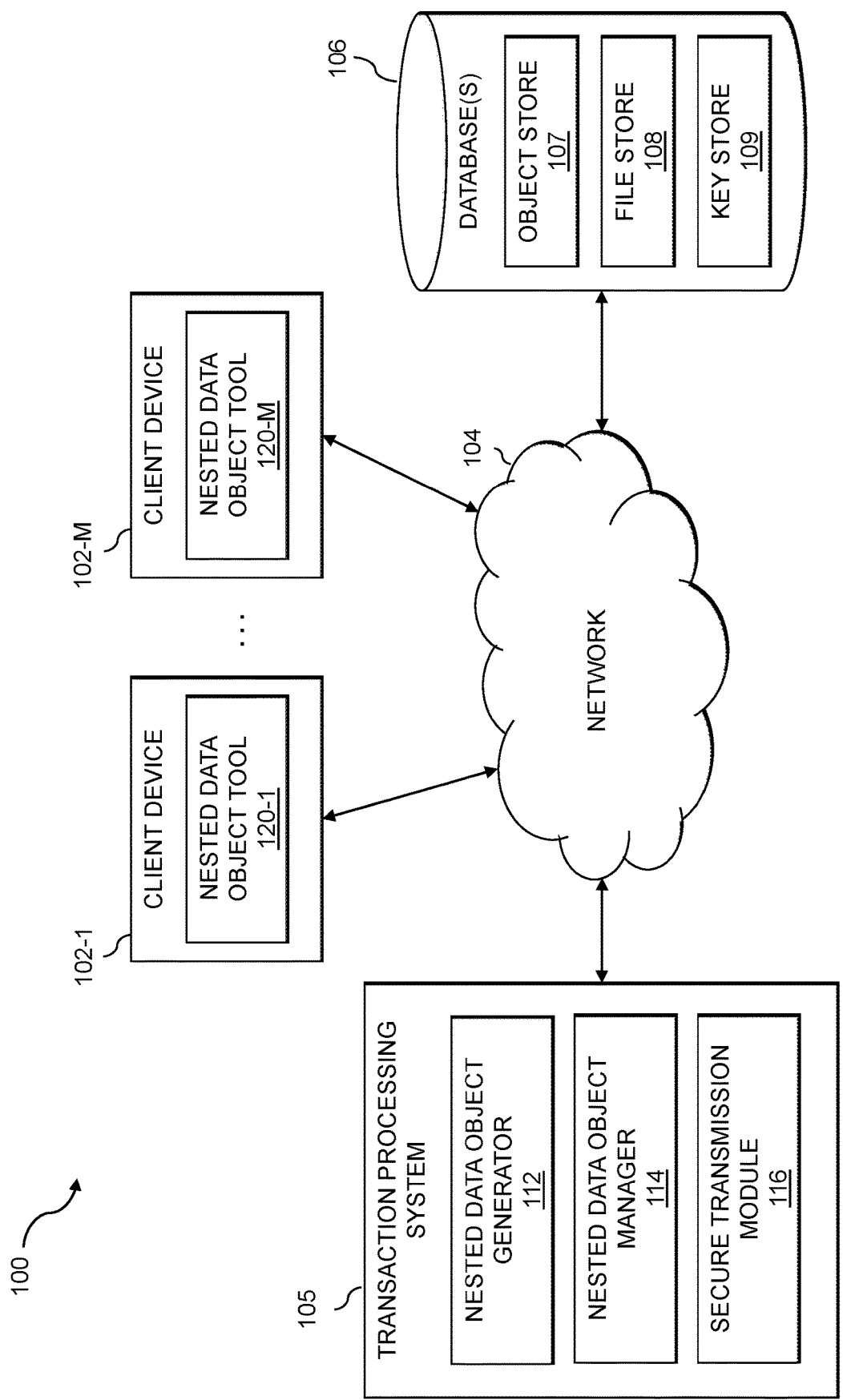
FIG. 1 shows an information processing system configured for processing transactions using nested data objects in an illustrative embodiment.

FIG. 1 shows a computer network (also referred to herein as an information processing system) 100 configured in accordance with an illustrative embodiment. The computer network 100 comprises a plurality of client devices 102-1, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a transaction processing system 105.

The client devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The client devices 102 also comprise respective nested data object tools 120-1, . . . 120-M, collectively referred to herein as nested data object tools 120. Each of the nested data object tools 120 can enable a user to perform one or more operations related to one or more nested data objects (including decryption operation and/or verification operations, for example), as explained in more detail elsewhere herein. In at least some embodiments, the nested data object tools 120 can be implemented as a service and/or a web application. Accordingly, at least some of the functionality associated with one or more of the nested data object tools 120 may be implemented using one or more other devices.

Also, it is to be appreciated that the term "user" as used herein is intended to be broadly construed so as to encompass, for example, human, hardware, software, or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the transaction processing system 105 can have at least one associated database 106 configured to store data pertaining to, for example, nested data objects, files, and/or keys (e.g., cryptographic keys). In the example shown in FIG. 1, the at least one database 106 includes an object store 107, a file store 108, and a key store 109.

An example database 106, such as depicted in the present embodiment, can be implemented using one or more storage systems associated with the transaction processing system 105 and/or client devices 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the transaction processing system 105 and/or client devices 102 are one or more input-output devices, which illustratively comprise keyboards, displays or other types of input-output devices in any combination. Such input-output devices can be used, for example, to support one or more user interfaces to the transaction processing system 105 and/or client devices 102, as well as to support communication between transaction processing system 105, client devices 102, and/or other related systems and devices not explicitly shown.

Additionally, the transaction processing system 105 in the FIG. 1 embodiment is assumed to be implemented using at least one processing device. Each such processing device generally comprises at least one processor and an associated memory, and implements one or more functional modules for controlling certain features of the transaction processing system 105.

More particularly, the transaction processing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the transaction processing system 105 to communicate over the network 104 with the client devices 102, and illustratively comprises one or more conventional transceivers.

The transaction processing system 105 further comprises a nested data object generator 112, a nested data object manager 114, and a secure transmission module 116.

Generally, the nested data object generator 112 generates one or more nested data objects related to one or more files (e.g., created by one or more users associated with the client devices 102 and possibly stored in the file store 108). In some embodiments, the nested data objects can be stored in the object store 107. The nested data object manager 114 can manage changes and/or types of access to the nested data objects. For example, the nested data object manager 114 can store one or more private keys in a given nested data object to enable different types of access to the nested data object and/or the one or more related files. The secure transmission module 116 can encrypt and transmit the nested data object to one or more of the client devices 102 using a corresponding public key (e.g., stored in the key store 109, for example). These and other features of the transaction processing system 105 are described in more detail elsewhere herein.

It is to be appreciated that this particular arrangement of elements 112, 114, and 116 illustrated in the transaction processing system 105 of the FIG. 1 embodiment is presented by way of example only, and alternative arrangements can be used in other embodiments. For example, the functionality associated with the elements 112, 114, and 116 in other embodiments can be combined into a single module, or separated across a larger number of modules. As another example, multiple distinct processors can be used to implement different ones of the elements 112, 114, and 116 or portions thereof.

At least portions of elements 112, 114, and 116 may be implemented at least in part in the form of software that is stored in memory and executed by a processor. In at least some embodiments, the transaction processing system 105, or portions thereof, can be implemented at least in part on one or more of the client devices 102.

It is to be understood that the particular set of elements shown in FIG. 1 for transaction processing system 105 involving client devices 102 of computer network 100 is presented by way of illustrative example only, and in other embodiments additional or alternative elements may be used. Thus, another embodiment includes additional or alternative systems, devices, and other network entities, as well as different arrangements of modules and other components. For example, in at least one embodiment, one or more of the transaction processing system 105 and database(s) 106 can be on and/or part of the same processing platform.

An exemplary process utilizing elements 112, 114, and 116 of an example transaction processing system 105 in computer network 100 will be described in more detail with reference to, for example, the flow diagram of FIG. 10.

Some embodiments described herein can include encapsulating transaction and related data using nested data objects, which can be stored in a centralized or distributed manner. The nested data objects are lightweight objects that can efficiently be transmitted, verified, and/or stored. In response to a client device receiving a given nested data object, the client device can read and verify one or more transactions (e.g., using a Secure Sockets Layer (SSL) certificate).

The term "nested data object" as used herein is intended to be broadly construed so as to encompass, for example, a data object representing at least one modular transaction. In some embodiments, each layer in the nested data object can be an immutable data object, and the nested data object can be updated by adding additional layers. For example, a new layer (or wrapper) is added to the existing nested data object for each transaction. The relationships between different layers of the nested data object can be resolved as a parent-child relationship. Also, at least some of the layers can be encrypted (e.g., using asymmetric encryption) to provide different types of access (e.g., author, approver, and/or viewer).

Accordingly, a nested data object can represent a chain of transactions between two or more entities (e.g., users), and one or more values (or possibly one or more files) can be stored inside the nested data object. In some embodiments, the file can be stored externally (e.g., in a content repository), and a hash value corresponding to the content of the file can be stored in the nested data object. The nested data object can prevent, for example, unauthorized updates of values and/or referenced documents, as such updates will result in a hash mismatch. If an unauthorized update is detected, then the layer of the nested data object corresponding to the unauthorized update can be invalidated (as well as any layers corresponding to subsequent transactions). Once invalidated, the nested data object can become active again after each involved entity (or one or more specified entities) provides approval.

According to some embodiments, the nested data objects can be applied in the context of document life cycle management systems. For example, one or more authors can generate a data object having a first layer. Each layer can be an asymmetrically encrypted serializable object vessel that represents a transaction, for example. A given layer can comprise one or more header values and a body, for example.

Figure 2:
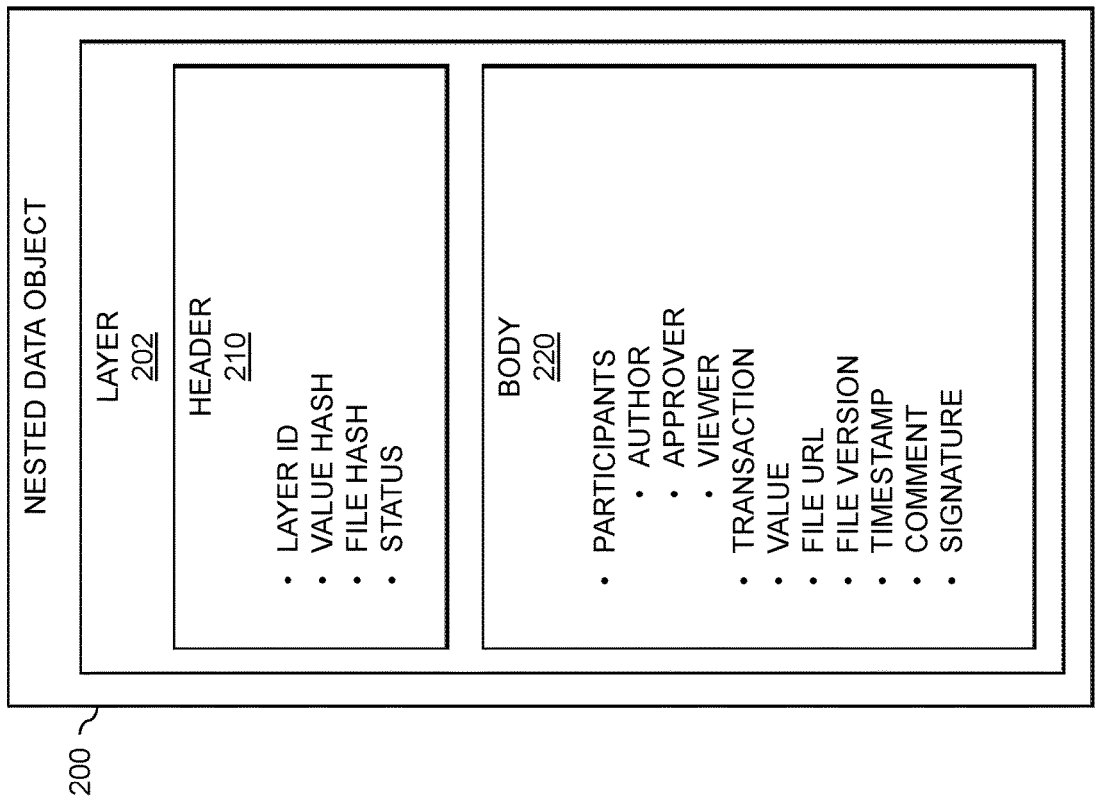
FIG. 2 shows an example of a nested data object in an illustrative embodiment.

FIG. 2 shows an example of a nested data object 200 in an illustrative embodiment. In this example, the nested data object 200 comprises a single layer 202, which includes a header 210 and a body 220. The header 210, in some embodiments, can include non-editable values (e.g., not editable by any user). The header values may include one or more of the following values:

1. Layer identifier (ID). The layer ID may correspond to a globally unique ID that identifies the layer 202.
2. Value hash. The value hash may include a hash value of at least some of the content stored inside the layer 202. For example, in some embodiments, the value hash can be computed for primitive values that are stored inside the layer 202 (e.g., numbers, strings, Boolean and/or values).
3. File hash. The file hash may include a hash value of a file (or document) that is referenced and/or stored within the layer 202. It is noted that the file, in some embodiments, can be stored externally (e.g., in a document management system), and a reference URL to the file can be stored within the layer 202. If an unauthorized update occurs in the file, then it will result in a hash mismatch, and the layer 202 can be invalidated, for example.
4. Status. The status may indicate the status of the layer 202 (e.g., initiated, in-progress, approved, or invalid).

The body 220 of the nested data object 200 can include information corresponding to one or more participants (or users) associated with the transaction. The users can be defined when the nested data object 200 is initialized, for example. In some embodiments, the body 220 can also indicate a type of user, for example, from among one or more of the following types: authors, approvers, and viewers.

For a user that is classified as an author, a key-value pair can be created based on the layer ID. For example, a private key can be stored in the layer 202 and/or a digital vault, and a public key can be kept at a server, which in some examples can correspond to transaction processing system 105. Alternatively, or additionally, the public key can be stored in a digital vault associated with a server (e.g., key store 109). Generally, the public key can be used to view and edit the contents in the layer 202, such as when an author or approver needs to modify the file. Additional layers can be added to the nested data object 200 based on the key assigned to a given author, as explained in further detail in conjunction with FIGS. 3-7, for example.

It is noted that a given layer in a nested data object can have multiple authors. For a user that is classified as an approver, a key-value pair can be created based on the layer ID. For example, a private key for a given approver can be stored in the layer 202, and a public key can be transmitted to the approver. If a user is classified as an approver, then the user can open the layer 202 and view the contents using the public key. The user can also accept or reject contents (or portions thereof) of the layer 202, for example, by adding one or more comments and/or a digital signature. A key-value pair is also created for each user that is classified as a viewer based on the layer ID. Generally, a user that is assigned the role of a viewer can use a public key to view the contents in the layer 202, but viewers are prevented from changing the content.

In at least some of the embodiments described herein, the body 220 of the layer 202 may also include one or more of the following fields:

1. Transaction. The transaction corresponds to a description of the transaction being captured. As a non-limiting example, for a contract document, the transaction can include, "draft contract for review," or some other description of the document (e.g., specified by one or more users).
2. Value. The value corresponds to the content associated with the layer. The value can be any content resulting from the current transaction.
3. File uniform resource locator (URL). The file URL corresponds to the network address of the file (e.g., document). The hash of this file can be automatically compared against the file hash in header 210.
4. File version. The file version indicates the version of the file that is referenced (or stored) in the layer 202.
5. Timestamp. The timestamp corresponds to a time when the layer 202 was created (e.g., in milliseconds).
6. Comments. Approver comments can be created by one or more users that are assigned an approver role. For example, the approver comments can be implemented as an array or key pair collection.
7. Signature. The layer can be digitally signed by users with an approval role, and this field can store the digital signature. The digital signature can be implemented as an array or a key-pair collection, for example.

It is to be appreciated that, in at least some embodiments, there can be any number of layers within a given nested object depending on the number of transactions (e.g., corresponding to added comments, updates to the value and/or file, etc.). Accordingly, any updates or additions to the value field (in the body 220), file, and/or comments will result in a new layer being created on top of the existing layers. By way of example, a new layer can be created by copying the structure of the previous layers and creating new key-value pairs for the users. In response to an author updating the file or value, the value hash and the file hash can be recomputed. When a layer is approved (e.g., by at least some of the approvers), the layer status will change to approved, and the layer can be sealed (e.g., to prevent further updates and/or additions to the approved layer).

A user that uses the final version of the file can verify all of the transactions in the nested layers. If the state of any of the layers is set to invalid, then the verification fails for the nested layers.

FIGS. 3-7 show nested data structures for a sequence of transactions in an illustrative embodiment. Although FIGS. 3-7 are generally described in the context of a contract management system, it is to be appreciated that the techniques can more generally be applied to contexts involving trusted transactions between two or more entities. It is also noted that the text shown in bold in FIGS. 3-7 represents values that have been inserted and/or changed.

Figure 3:
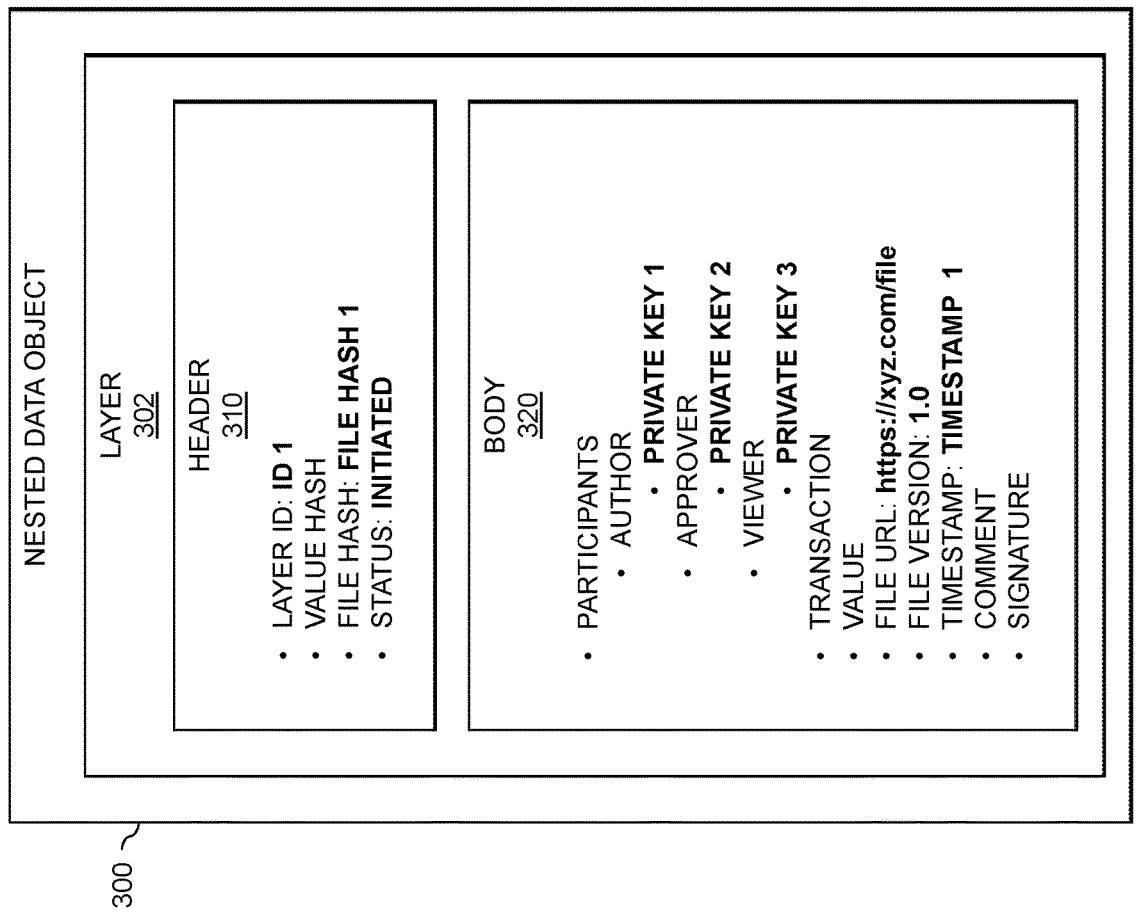
FIGS. 3-7 show nested data structures corresponding to a sequence of transactions in an illustrative embodiment.

FIG. 3 shows a nested data object 300 having a layer 302, which includes a header 310 and a body 320. In this example, it is assumed that the nested data object 300 is created by a user (e.g., Author A), e.g., via a user interface (UI). As an example, nested data object 300 can be created in response to Author A selecting or creating a given file (e.g., a contract document) by interacting with one or more UI elements (e.g., buttons, text fields, drop-down menus, etc.). In some embodiments, the nested data object 300 can initially be created with a set of default values (e.g., key pair(s) for authors, approvers, and viewers). In this example, private keys (private keys 1-3) are generated for three different types of users (author, approver, and viewer) and stored in the participants field of body 320. Public keys corresponding to the private keys are also created and can be stored in a vault. The system (e.g., transaction processing system 105) can then send a public key back to Author A. Author A can obtain the corresponding private key from the nested data object 300 using the public key. The private key controls the type of access that is assigned to Author A.

In the FIG. 3 example, it is assumed that Author A adds one or more types of users to the nested data object 300. For example, Author A may add one or more authors (e.g., Author A and Author B), one or more approvers (e.g., Approver A, Approver B, and Approver C), and one or more viewers (e.g., Viewer A and Viewer B). It is also assumed that Author A has selected the nested data object 300 (e.g., via the UI) and has added or provided details related to the file. More specifically, a file URL (https://xyz.com/file) has been added to the body 320 as well as a file version (1.0). In response, a file hash for the file is created (based on the contents of the file) and the value (file hash 1) is added to the file hash field of the header 310, and the status field in header 310 is set to initiated. A timestamp (timestamp 1) is also added to the body 320.

Now assume that Author A makes one or more additional edits to the file and saves the file to the system. Author A also adds a transaction description (e.g., "Draft file"), and a value associated with the file (e.g., if the file is a contract, then the value may represent a total monetary value associated with the contract). The system then generates a new layer based on these changes, as shown in FIG. 4, for example.

Figure 4:
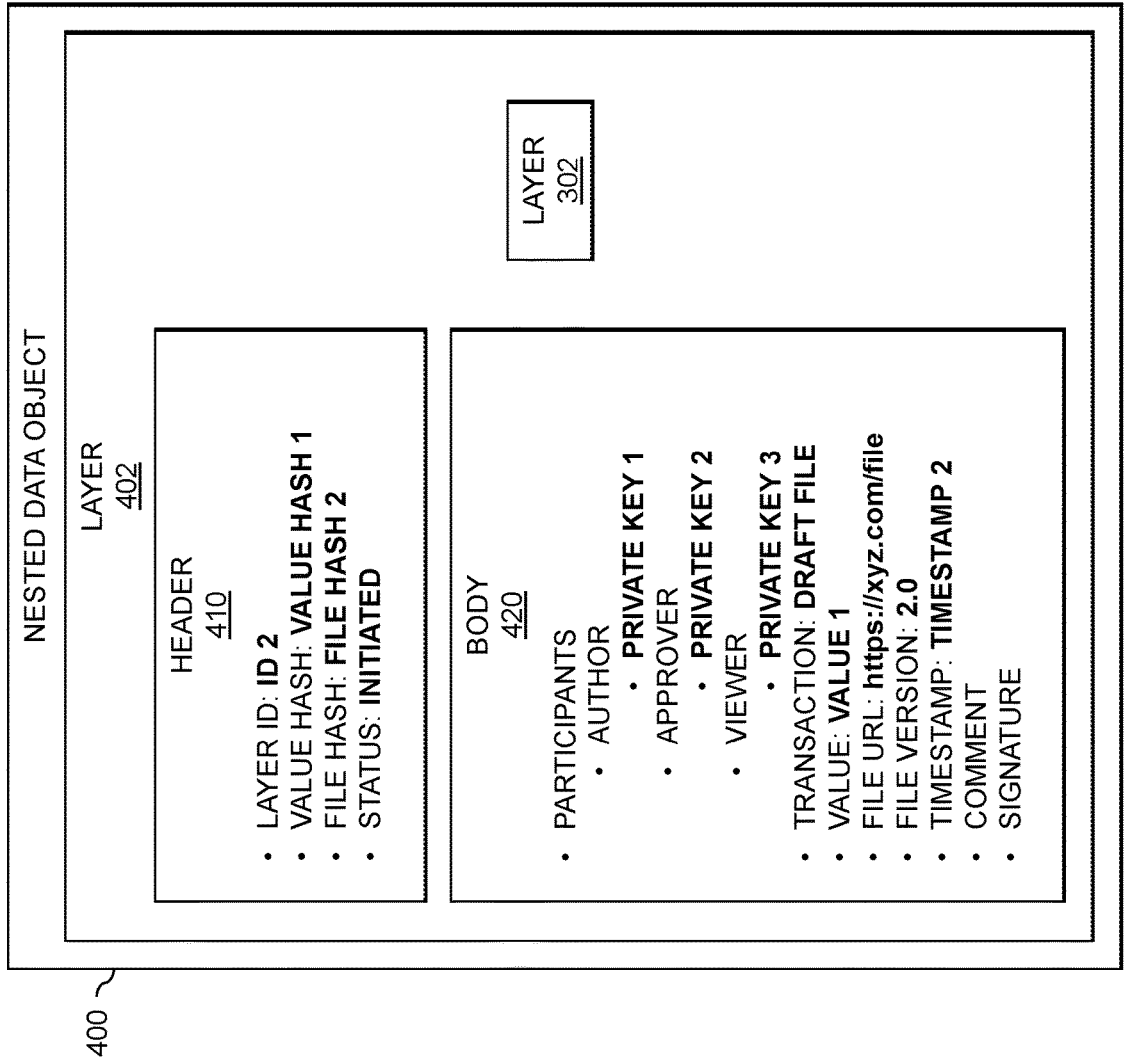
Figure 5:
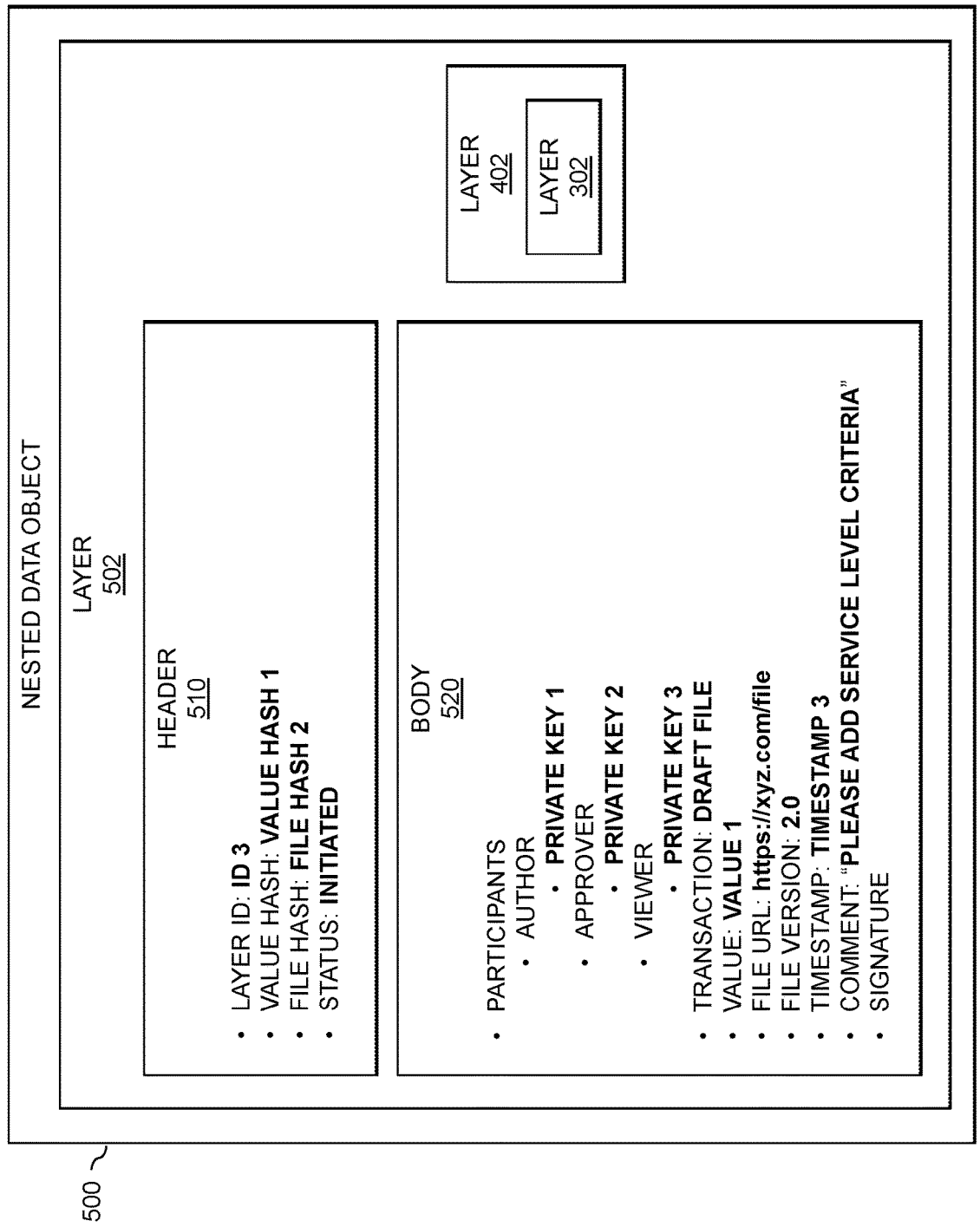

In particular, FIG. 4 shows a nested data object 400 that includes layer 402, which comprises a header 410 and a body 420 that have been updated based on the changes made by Author A. For example, the nested data object 400 can be generated by copying the layer 302 into layer 402 and then updating the relevant fields in the header 410 and body 420. A value hash (value hash 1) is automatically computed based on the value field of the body 420 and added to the value hash field of header 410. The file hash is also recomputed based on the changes made to the file, and the updated value (file hash 2) is added to the header 410.

Next, it is assumed that Approver A logs into the system and selects the file. The nested data object 400 is transmitted (e.g., via an https protocol) to the client device of Approver A, along with a public key (e.g., Public Key 2), which is assumed to correspond to Approver A.

Approver A can use public key 2 to decrypt layer 402 of the nested data object 400 (e.g., using any suitable client-side framework, such as a java script framework). Since Approver A is assigned an approver role, Approver A will not be allowed to edit the contract or value. Rather, Approver A can review and/or add comments. For example, Approver A can add the following comment, "please add the service level criteria"). In response to adding the comment, the nested data object 500 shown in FIG. 5 can be created.

The nested data object 500 can be created in a similar manner as described in conjunction with the nested data object 400. For example, layers 302 and 402 can be added to layer 502 of nested data object 500, and the relevant fields in the header 510 and body 520 can be updated to reflect the comment added by approver A. More specifically, a new layer ID (ID 3) is added to header 510, and new key-value pairs are created for layer 502, and the comment from Approver A is added to the comment field in body 520. The other layers 302 and 402 are nested in the layer 502, and the nested data object 500 can be stored in an object data store (e.g., object store 107).

Now Author A can access the nested data object 500 (e.g., using the public key assigned to Author A) to view and/or edit the file. For example, Author A can update the file to include the change requested by Approver A, thereby creating a third version (version 3.0) of the file.

Figure 6:
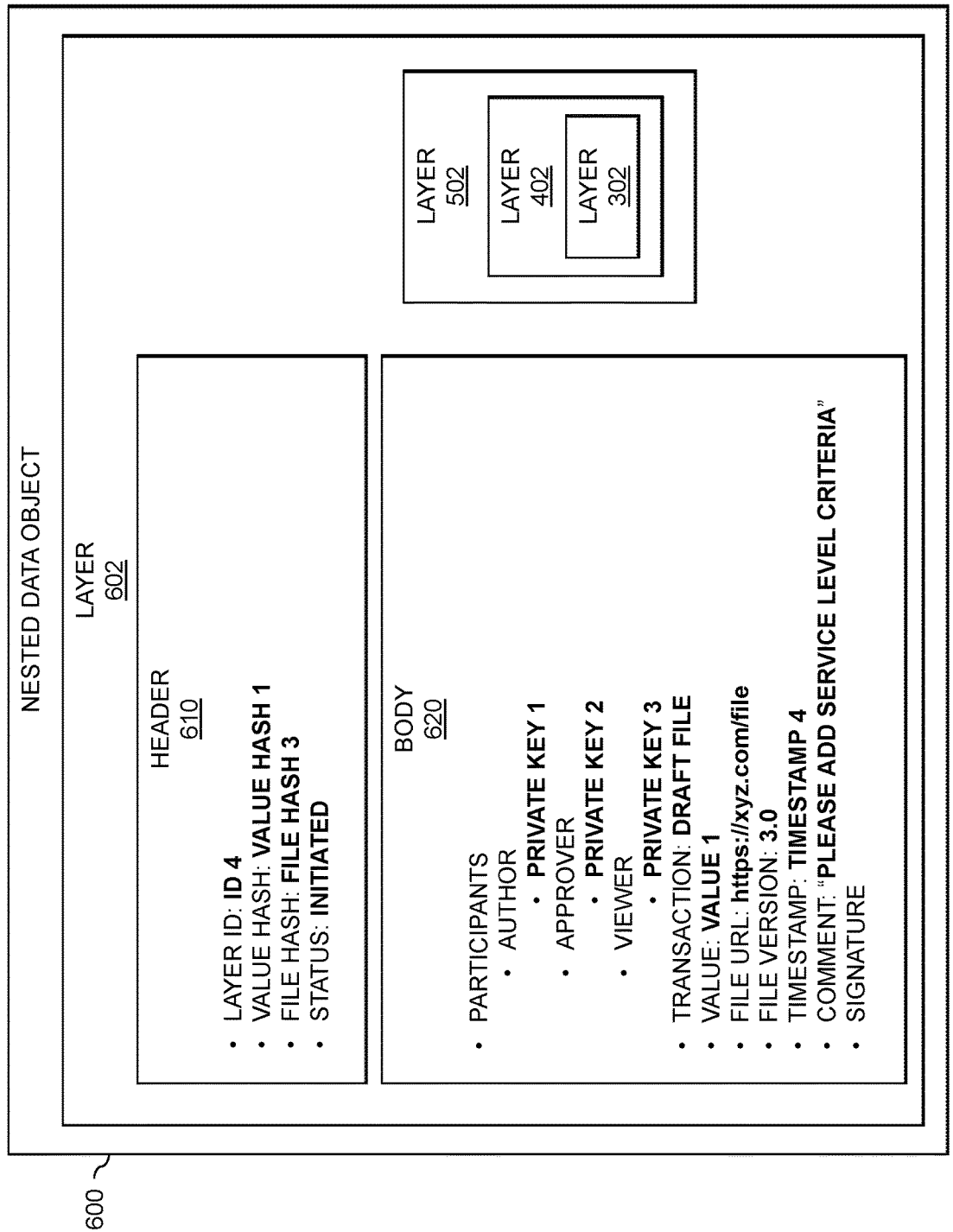

FIG. 6 shows a nested data object 600, where the fields of header 610 and body 620 of layer 602 have been updated in response to the changes made by Author A. The layer 602 is generated in a similar manner as described in conjunction with FIGS. 4 and 5, for example. Thus, layer 602 includes nested layers 302, 402, and 502.

Figure 7:
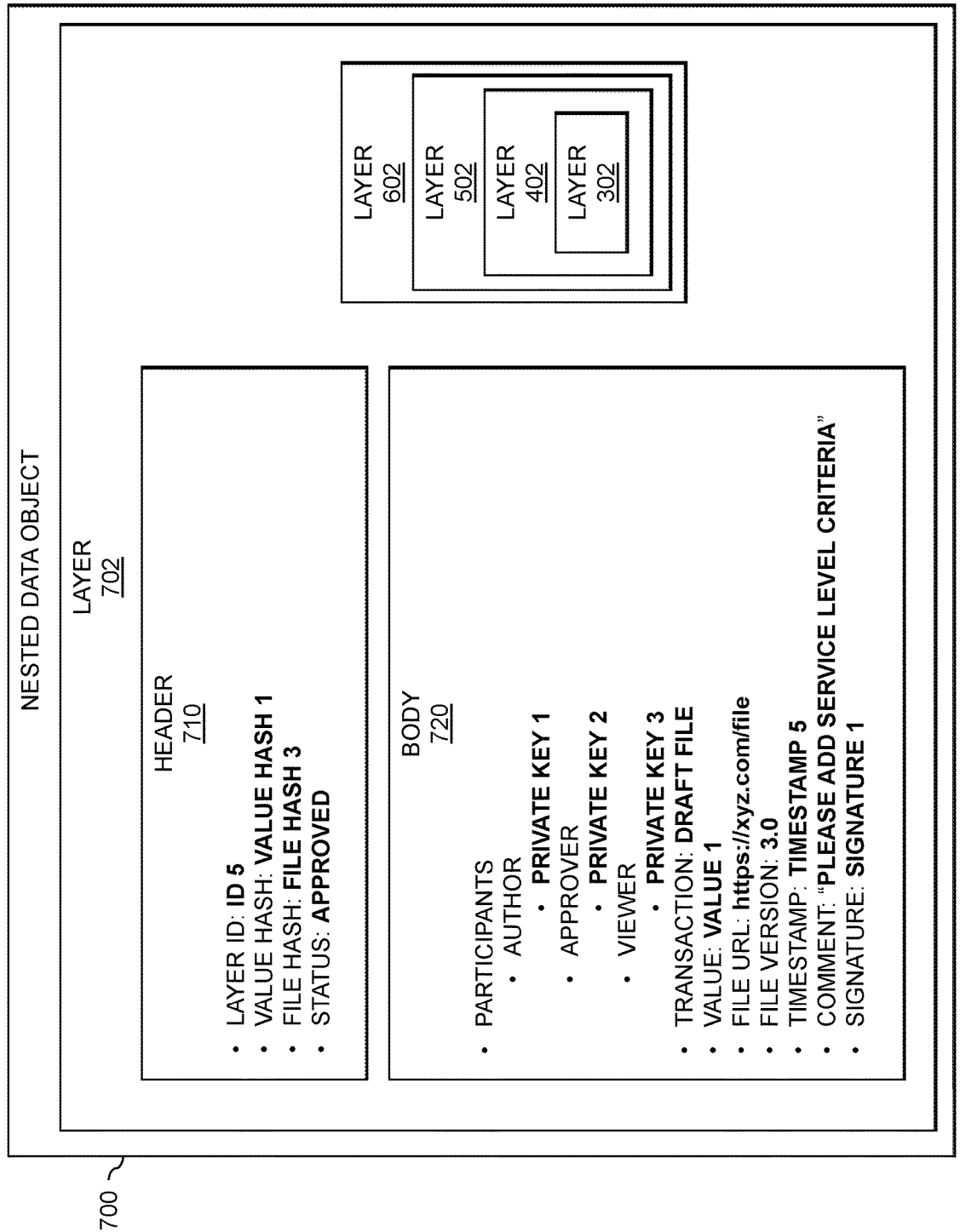

Communication between the users can continue until the file is approved. Once approved, the status of the nested data object can be updated to indicate that the file is approved. By way of example, FIG. 7 shows a nested data object 700, where the header 710 and the body 720 of layer 702 have updated to indicate that the file is approved. In particular, a digital signature (signature 1) has been added to the body 720, and the status in the header 710 is updated to approved. The layer 702 now includes each of the prior layers 302, 402, 502, and 602. In response to the file being approved, the nested data object 700 is "sealed," thereby preventing any further changes to the file.

Figure 8:
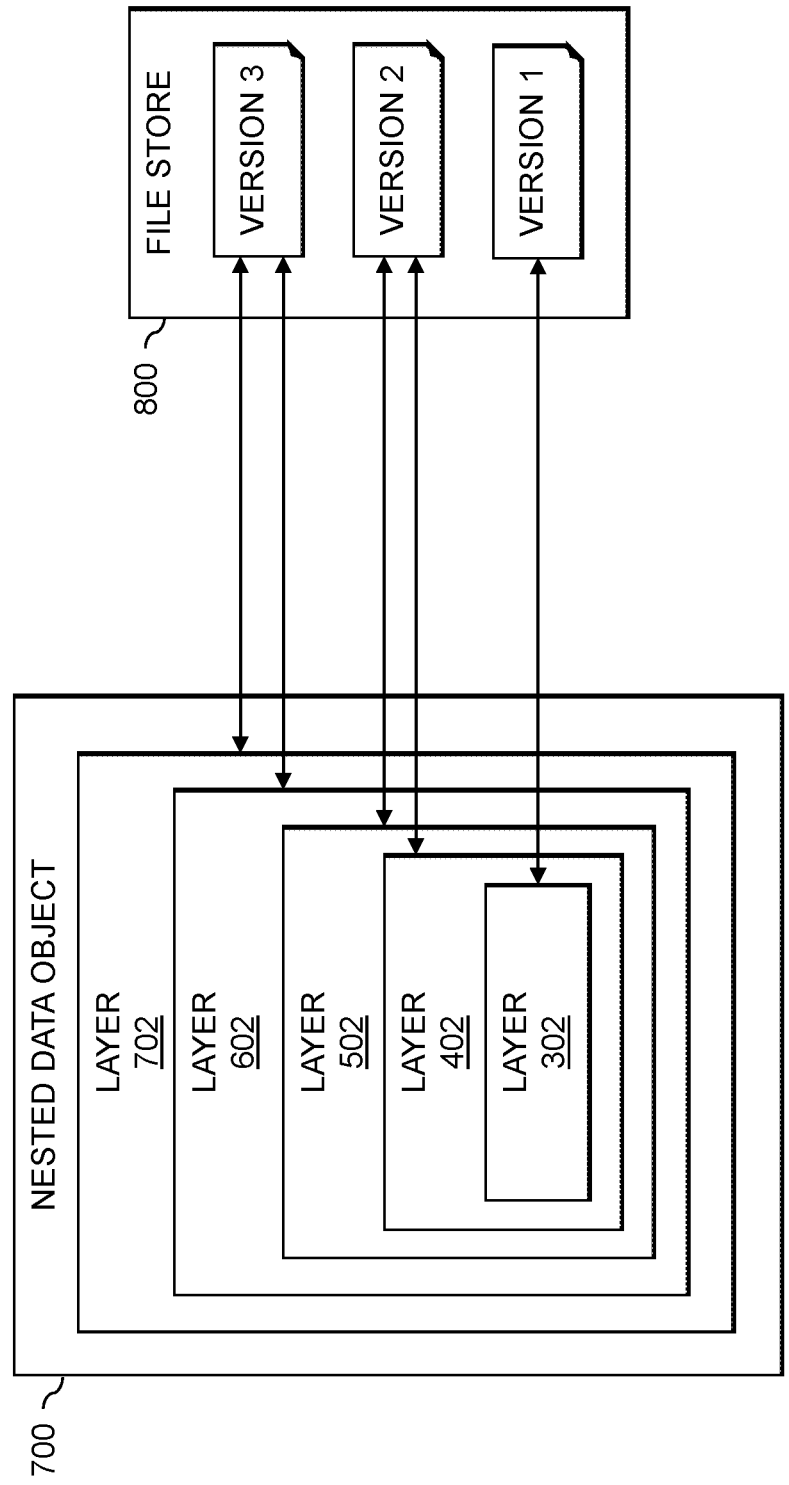
FIG. 8 shows mappings between a nested data object and different versions of a file in an illustrative embodiment.

FIG. 8 shows the mappings between the nested data object 700 and a file store 800. Specifically, layer 302 is mapped to version 1 of the file in the file store 800, layers 402 and 502 are mapped to version 2 of the file, and layers 602 and 702 are mapped to version 3 of the file. The nested data object 700 can be made available to other users and/or applications once it is sealed, where each transaction can be verified.

In some instances, a file may need to be further amended based on one or more additional requests (e.g., from a customer or user). Although an approved nested data object cannot be edited, it can be copied to create a new nested data object, as shown in FIG. 9, for example.

Figure 9:
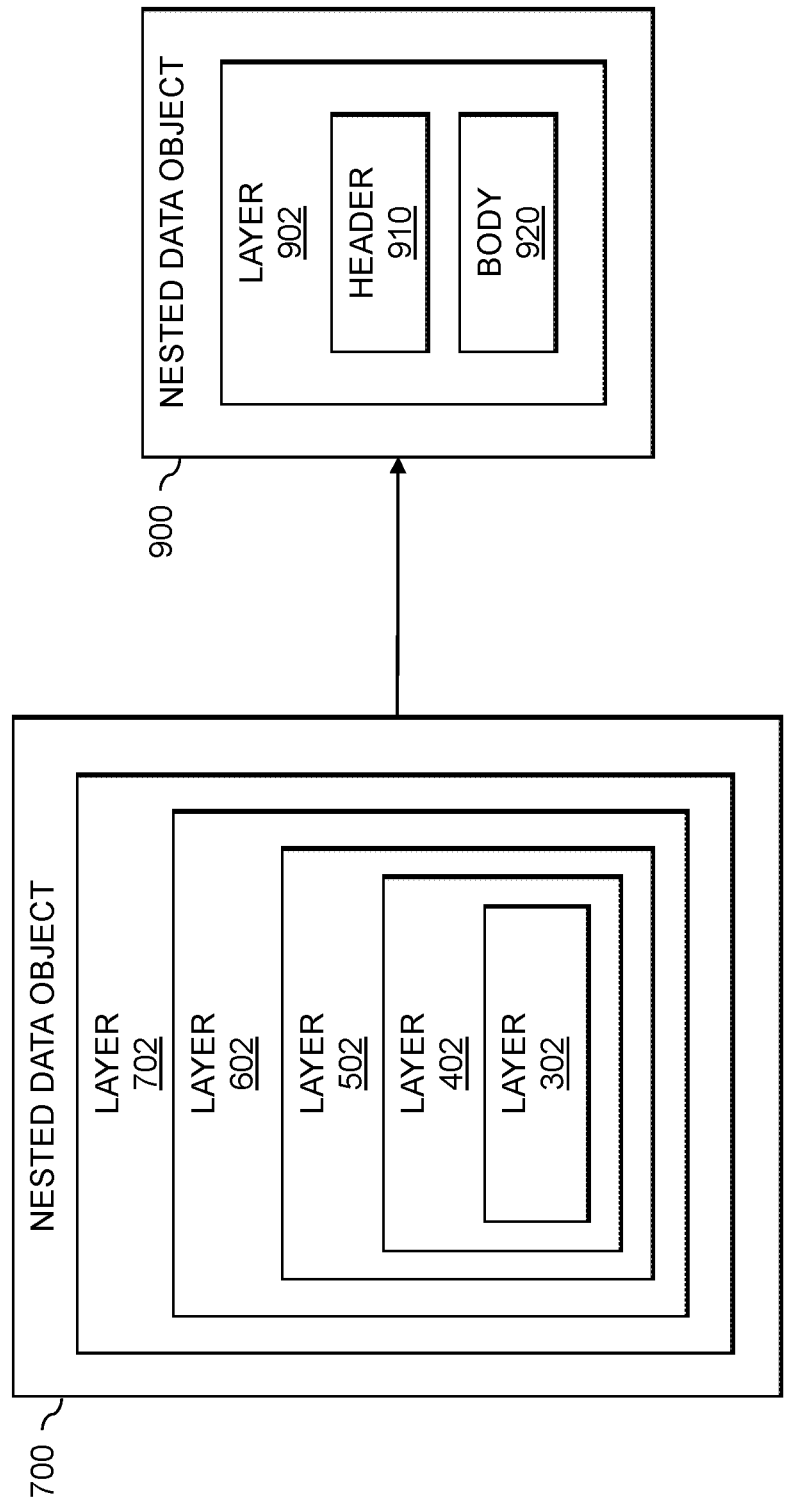
FIG. 9 shows a first nested data object that is created using a second nested data object in an illustrative embodiment.

FIG. 9 shows a nested data object 900, having a layer 902, which includes a header 910 and a body 920, that is created based on the "sealed" nested data object 700. This can be helpful in situations where a new file needs to be created based on a file that has already been approved. In one such embodiment, the new nested data object 900 can maintain the relationship with the approved nested data object 700 and can carry the value and referenced external document. The user can optionally add different participants.

By way of example, if the file is for a customer contract, then a user (e.g., a sales agent) can be assigned an author role for the nested data object 900 and a customer can be added as a reviewer role in the body 920. The sales agent can then edit the contract value and/or the external contract file in response to one or more requests (e.g., added in the comments field of the body 920). When the customer approves the file, the nested data object 900 (which includes layers for each transaction) is marked as approved in the header 910 and stored for the corresponding order.

Unlike blockchain technology, an entire nested data object can be efficiently transferred to a client device as it is a lightweight object that requires minimal resources (e.g., storage and/or network resources). A given user can then quickly verify the authenticity of the file (e.g., within milliseconds) as the nested data object is present at the client side. For example, the contract can be verified by computing hashes based on the contents of the file and/or value specified in the body of the nested data object and comparing the computed values to the values stored in the header of the nested data object.

If a malicious user attempts to change a file (e.g., directly in a content management system), then the file hash stored in the nested data object and the file hash computed based on the contents of the document will be different. This is also the case with the value field. For example, if an unauthorized update is made to the value in the body of the nested data object, then it will cause a mismatch with the value hash. In such situations, each layer of the nested data object that was added after the layer that was changed is automatically invalidated (e.g., the status field in the body can be set to "invalid").

If a nested data object is marked as invalid, then, in some embodiments, any user that is assigned an approver role will be required to re-approve the contract to remove the invalid status. When the invalid status is removed, the system re-hashes the file and value so that the nested data object becomes valid to use.

Figure 10:
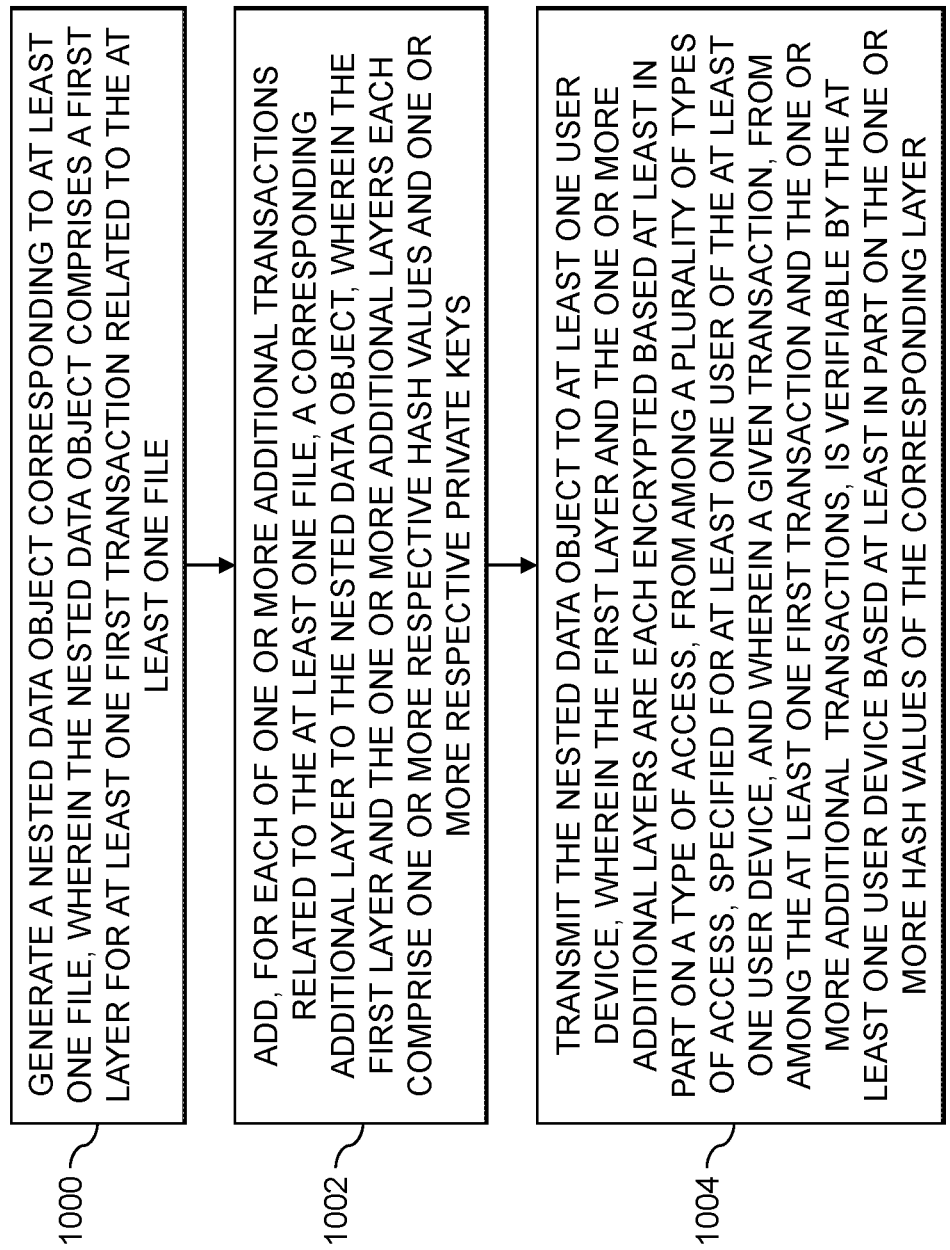
FIG. 10 shows a flow diagram of a process for processing transactions using nested data objects in an illustrative embodiment.

FIG. 10 is a flow diagram of a process for processing transactions using nested data objects in an illustrative embodiment. It is to be understood that this particular process is only an example, and additional or alternative processes can be carried out in other embodiments.

In this embodiment, the process includes steps 1000 through 1004. These steps are assumed to be performed by the transaction processing system 105 utilizing its elements 112, 114, and 116.

Step 1000 includes generating a nested data object corresponding to at least one file, wherein the nested data object comprises a first layer for at least one first transaction related to the at least one file.

Step 1002 includes adding, for each of one or more additional transactions related to the at least one file, a corresponding additional layer to the nested data object, wherein the first layer and the one or more additional layers each comprise one or more respective hash values and one or more respective private keys.

Step 1004 includes transmitting the nested data object to at least one user device, wherein the first layer and the one or more additional layers are each encrypted based at least in part on a type of access, from among a plurality of types of access, specified for at least one user of the at least one user device, and wherein a given transaction, from among the at least one first transaction and the one or more additional transactions, is verifiable by the at least one user device based at least in part on the one or more hash values of the corresponding layer.

The one or more respective hash values of at least one of the layers of the nested data object may include at least one of: a first hash value that is computed based on contents of the at least one file; and a second hash value that is computed based on at least one value stored in the at least one of the layers of the nested data object. The at least one user device may detect one or more unauthorized changes to at least one of: (i) the at least one file and (ii) the at least one value based on at least one of: a comparison of the first hash value to another hash value that is computed by the at least one user device using the contents of the at least one file; and a comparison of the second hash value to another hash value that is computed by the at least one user device using the contents of the at least one value stored in the at least one of the layers of the transmitted nested data object. The at least one of the layers of the nested data object and each layer that was subsequently added to the nested data object may be assigned an invalid status in response to detecting the one or more unauthorized changes. The invalid status assigned to the at least one of the layers of the nested data object and each layer that was subsequently added to the nested data object may be removed in response to obtaining approval from one or more users identified in the at least one of the layers of the nested data object as having an approval role. The type of access specified for the at least one user at a given one of the layers may be controlled at least in part by at least one of the corresponding one or more private keys. The plurality of types of access may correspond to at least one of: (i) access to edit the at least one file; (ii) access to read the at least one file; and (iii) access to approve the at least one file. A given layer of the nested data object may include one or more fields corresponding to at least one of: a timestamp field of the transaction corresponding to the given layer; at least one file version of the at least one file; at least one address of the at least one file; one or more user comments associated with the at least one file; and one or more digital signatures. A given layer of the nested data object may include information identifying one or more users having an approval role, and the process may further include a step of: receiving an indication approving the at least one file from at least one user device of at least one of the one or more users having the approval role; and in response to the receiving the indication, preventing changes to the at least one file by assigning a status indicating that the given layer is approved. The process may further include a step of: generating a new nested data object based at least in part on the nested data object having the assigned status indicating that the given layer is approved. The at least one file may be stored separately from the nested data object. Each layer that is added to the nested data object may be stored as an immutable object. The nested data object may be transmitted based on at least one of: a hypertext transfer protocol and a transport layer security protocol.

Accordingly, the particular processing operations and other functionality described in conjunction with the flow diagram of FIG. 10 are presented by way of illustrative example only and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the speed and reduce the number of resources that are needed to process and verify transactions. These and other embodiments can effectively mitigate technical problems associated with existing techniques (including blockchain techniques), that are often slow and/or require significant resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories, and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors, each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
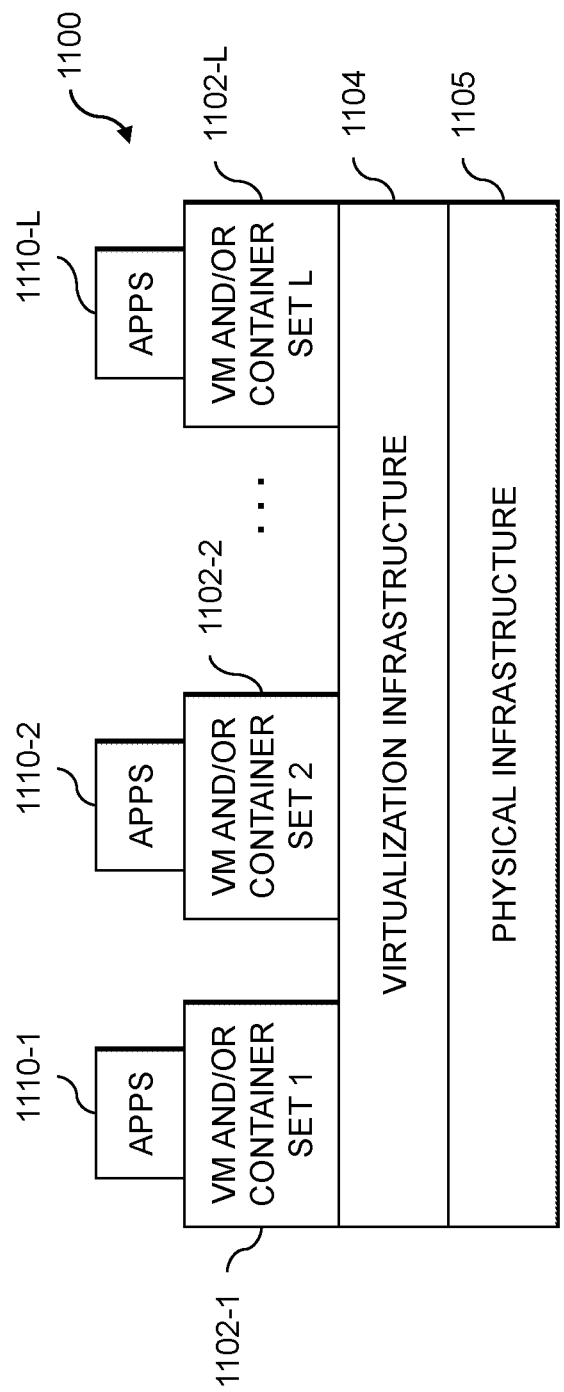
FIGS. 11 and 12 show examples of processing platforms that may be utilized to implement at least a portion of an information processing system in illustrative embodiments.
Figure 12:
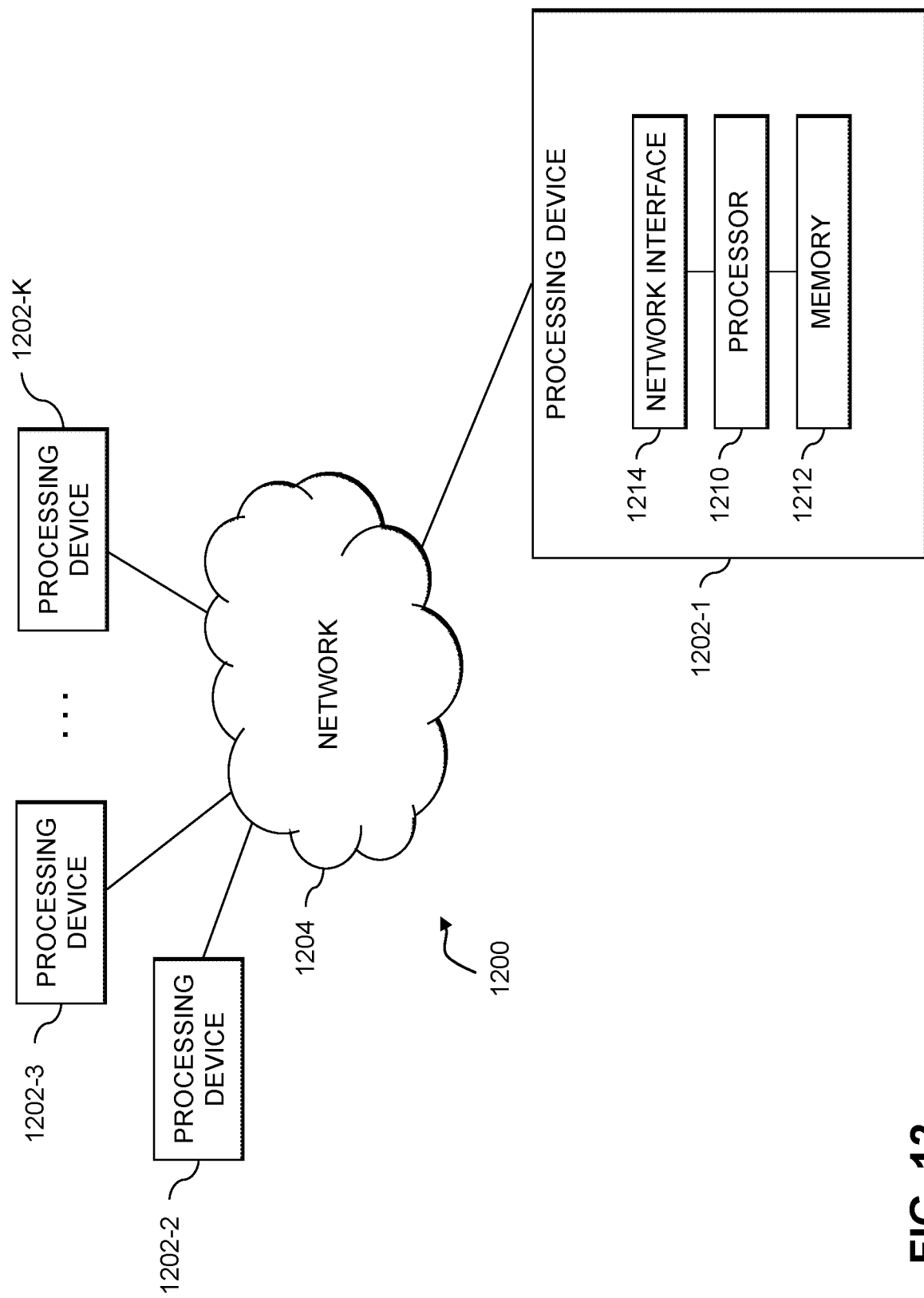

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a microcontroller, an ASIC, an FPGA or other type of processing circuitry, as well as portions or combinations of such circuitry elements.

The memory 1212 comprises RAM, ROM or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   generating a nested data object corresponding to at least one file, wherein the nested data object comprises a first layer for at least one first transaction related to the at least one file;
   adding, for each of one or more additional transactions related to the at least one file, a corresponding additional layer to the nested data object, wherein the first layer and the one or more additional layers each comprise one or more respective hash values and one or more respective private keys; and
   transmitting the nested data object to at least one user device, wherein the first layer and the one or more additional layers are each encrypted based at least in part on a type of access, from among a plurality of types of access, specified for at least one user of the at least one user device, and wherein a given transaction, from among the at least one first transaction and the one or more additional transactions, is verifiable by the at least one user device based at least in part on the one or more respective hash values of the corresponding layer;
   wherein the method is performed by at least one processing device comprising a processor coupled to a memory.

2. The computer-implemented method of claim 1, wherein the one or more respective hash values of at least one of the first layer and the one or more additional layers of the nested data object comprise at least one of:
   a first hash value that is computed based on contents of the at least one file; and
   a second hash value that is computed based on at least one value stored in the at least one of the first layer and the one or more additional layers of the nested data object.

3. The computer-implemented method of claim 2, wherein the at least one user device detects one or more unauthorized changes to at least one of: (i) the at least one file and (ii) the at least one value based on at least one of:
   a comparison of the first hash value to another hash value that is computed by the at least one user device using the contents of the at least one file; and
   a comparison of the second hash value to another hash value that is computed by the at least one user device using the contents of the at least one value stored in the at least one of the first layer and the one or more additional layers of the transmitted nested data object.

4. The computer-implemented method of claim 3, wherein the at least one of the first layer and the one or more additional layers of the nested data object and each layer that was subsequently added to the nested data object are assigned an invalid status in response to detecting the one or more unauthorized changes.

5. The computer-implemented method of claim 4, wherein the invalid status assigned to the at least one of the first layer and the one or more additional layers of the nested data object and each layer that was subsequently added to the nested data object is removed in response to obtaining approval from one or more users identified in the at least one of the first layer and the one or more additional layers of the nested data object as having an approval role.

6. The computer-implemented method of claim 1, wherein the type of access specified for the at least one user at a given one of the first layer and the one or more additional layers is controlled at least in part by at least one of the corresponding one or more respective private keys, and wherein the plurality of types of access corresponds to at least one of: (i) access to edit the at least one file; (ii) access to read the at least one file; and (iii) access to approve the at least one file.

7. The computer-implemented method of claim 1, wherein a given layer of the nested data object comprises one or more fields corresponding to at least one of:
   a timestamp field of the transaction corresponding to the given layer;
   at least one file version of the at least one file;
   at least one address of the at least one file;
   one or more user comments associated with the at least one file; and
   one or more digital signatures.

8. The computer-implemented method of claim 1, wherein a given layer of the nested data object comprises information identifying one or more users having an approval role, and wherein the method further comprises:
   receiving an indication approving the at least one file from at least one user device of at least one of the one or more users having the approval role; and
   in response to the receiving the indication, preventing changes to the at least one file by assigning a status indicating that the given layer is approved.

9. The computer-implemented method of claim 8, further comprising:
   generating a new nested data object based at least in part on the nested data object having the assigned status indicating that the given layer is approved.

10. The computer-implemented method of claim 1, wherein the at least one file is stored separately from the nested data object.

11. The computer-implemented method of claim 1, wherein each layer that is added to the nested data object is stored as an immutable object.

12. The computer-implemented method of claim 1, wherein the nested data object is transmitted based on at least one of: a hypertext transfer protocol and a transport layer security protocol.

13. A non-transitory processor-readable storage medium having stored therein program code of one or more software programs, wherein the program code when executed by at least one processing device causes the at least one processing device:
   to generate a nested data object corresponding to at least one file, wherein the nested data object comprises a first layer for at least one first transaction related to the at least one file;
   to add, for each of one or more additional transactions related to the at least one file, a corresponding additional layer to the nested data object, wherein the first layer and the one or more additional layers each comprise one or more respective hash values and one or more respective private keys; and to transmit the nested data object to at least one user device, wherein the first layer and the one or more additional layers are each encrypted based at least in part on a type of access, from among a plurality of types of access, specified for at least one user of the at least one user device, and wherein a given transaction, from among the at least one first transaction and the one or more additional transactions, is verifiable by the at least one user device based at least in part on the one or more respective hash values of the corresponding layer.

14. The non-transitory processor-readable storage medium of claim 13, wherein the one or more respective hash values of at least one of the first layer and the one or more additional layers of the nested data object comprise at least one of:

a first hash value that is computed based on contents of the at least one file; and a second hash value that is computed based on at least one value stored in the at least one of the first layer and the one or more additional layers of the nested data object.

15. The non-transitory processor-readable storage medium of claim 14, wherein the at least one user device detects one or more unauthorized changes to at least one of: (i) the at least one file and (ii) the at least one value based on at least one of:

a comparison of the first hash value to another hash value that is computed by the at least one user device using the contents of the at least one file; and a comparison of the second hash value to another hash value that is computed by the at least one user device using the contents of the at least one value stored in the at least one of the first layer and the one or more additional layers of the transmitted nested data object.

16. The non-transitory processor-readable storage medium of claim 15, wherein the at least one of the first layer and the one or more additional layers of the nested data object and each layer that was subsequently added to the nested data object are assigned an invalid status in response to detecting the one or more unauthorized changes.

17. An apparatus comprising:

at least one processing device comprising a processor coupled to a memory;

the at least one processing device being configured:

to generate a nested data object corresponding to at least one file, wherein the nested data object comprises a first layer for at least one first transaction related to the at least one file;

to add, for each of one or more additional transactions related to the at least one file, a corresponding additional layer to the nested data object, wherein the first layer and the one or more additional layers each comprise one or more respective hash values and one or more respective private keys; and to transmit the nested data object to at least one user device, wherein the first layer and the one or more additional layers are each encrypted based at least in part on a type of access, from among a plurality of types of access, specified for at least one user of the at least one user device, and wherein a given transaction, from among the at least one first transaction and the one or more additional transactions, is verifiable by the at least one user device based at least in part on the one or more respective hash values of the corresponding layer.

18. The apparatus of claim 17, wherein the one or more respective hash values of at least one of the first layer and the one or more additional layers of the nested data object comprise at least one of:

a first hash value that is computed based on contents of the at least one file; and a second hash value that is computed based on at least one value stored in the at least one of the first layer and the one or more additional layers of the nested data object.

19. The apparatus of claim 18, wherein the at least one user device detects one or more unauthorized changes to at least one of: (i) the at least one file and (ii) the at least one value based on at least one of:

a comparison of the first hash value to another hash value that is computed by the at least one user device using the contents of the at least one file; and a comparison of the second hash value to another hash value that is computed by the at least one user device using the contents of the at least one value stored in the at least one of the first layer and the one or more additional layers of the transmitted nested data object.

20. The apparatus of claim 19, wherein the at least one of the first layer and the one or more additional layers of the nested data object and each layer that was subsequently added to the nested data object are assigned an invalid status in response to detecting the one or more unauthorized changes.

* * * * *